(12) United States Patent
Butler et al.

(10) Patent No.: US 11,060,398 B2
(45) Date of Patent: Jul. 13, 2021

(54) PULSE-SEQUENCE DESIGN TO REDUCE MOTION EFFECTS AND CHARACTERIZE TOOL MOTION DURING LOGGING

(71) Applicant: Halliburton Energy Services, Inc., Houston, TX (US)

(72) Inventors: Mark C. Butler, Kingwood, TX (US); Rebecca Corina Jachmann, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 117 days.

(21) Appl. No.: 16/557,336

(22) Filed: Aug. 30, 2019

(65) Prior Publication Data

US 2021/0062643 A1 Mar. 4, 2021

(51) Int. Cl.
*G01V 3/32* (2006.01)
*G01V 3/38* (2006.01)
*E21B 47/13* (2012.01)
*G01V 3/34* (2006.01)

(52) U.S. Cl.
CPC ............... *E21B 47/13* (2020.05); *G01V 3/32* (2013.01); *G01V 3/34* (2013.01); *G01V 3/38* (2013.01)

(58) Field of Classification Search
CPC . E21B 47/13; G01V 3/32; G01V 3/34; G01V 3/38
See application file for complete search history.

(56) References Cited

U.S. PATENT DOCUMENTS

| | | | |
|---|---|---|---|
| 5,023,551 A * | 6/1991 | Kleinberg | G01N 24/081 |
| | | | 324/303 |
| 6,163,153 A | 12/2000 | Reiderman et al. | |
| 6,268,726 B1 | 7/2001 | Prammer et al. | |
| 6,437,564 B1 | 8/2002 | Itskovich et al. | |
| 6,459,263 B2 | 10/2002 | Hawkes et al. | |
| 6,566,874 B1 | 5/2003 | Speier et al. | |
| 7,268,547 B2 | 9/2007 | Kruspe et al. | |
| 7,733,086 B2 * | 6/2010 | Prammer | G01N 24/081 |
| | | | 324/303 |
| 2005/0088176 A1 | 4/2005 | Kruspe et al. | |
| 2005/0248342 A1 | 11/2005 | Rottengatter et al. | |

(Continued)

OTHER PUBLICATIONS

International Search Report and Written Opinion for Application No. PCT/US2019/049143, dated May 29, 2020.

*Primary Examiner* — Reena Aurora
(74) *Attorney, Agent, or Firm* — Benjamin Ford; C. Tumey Law Group PLLC

(57) ABSTRACT

A method may comprise disposing a nuclear magnetic resonance logging tool into a wellbore, identifying an upper limit of an amplitude for tool motion, identifying a frequency range based at least in part on the upper limit of the amplitude for tool motion, measuring the one or more frequencies from the echo train, and performing a frequency-domain processing of the one or more frequencies to suppress distortions in an echo train. A system may comprise a nuclear magnetic resonance logging tool and an information handling system. The nuclear magnetic resonance logging tool may further comprise an electromagnetic transmitter configured to emit a magnetic field, a radio frequency transmitter configured to transmit a pulse and one or more refocusing pulses, and a receiver configured to detect one or more frequencies from an echo train.

19 Claims, 8 Drawing Sheets

(56) References Cited

U.S. PATENT DOCUMENTS

2007/0222443 A1   9/2007  Blanz
2016/0018555 A1   1/2016  Jachmann et al.
2016/0202384 A1*  7/2016  Utsuzawa .............. E21B 17/10
                                              324/303

* cited by examiner

LONGITUDINAL RECOVERY, T1

TRANSVERSE RELAXATION, T2

PULSE-SEQUENCE DESIGN TO REDUCE MOTION EFFECTS AND CHARACTERIZE TOOL MOTION DURING LOGGING

BACKGROUND

Nuclear magnetic resonance (NMR) is used as a tool in a number of different technology areas to investigate different types of mediums. NMR may occur when the medium is subjected to a static magnetic field, $B_0$, and to an oscillating magnetic field, $B_1$. When subjected to an applied static magnetic field, polarization of nuclear magnetic spins of the medium occurs based on nuclear magnetic dipole and magnetic field strength. Applying an oscillating magnetic field to the medium in the static magnetic field may perturb the polarization established by the static magnetic field. In optimal measurements, the static magnetic field and the perturbing field are perpendicular to each other. Collected responses received from the medium related to the total magnetization of nuclear spins in the medium, in response to these applied fields may be used to investigate properties of the medium and may provide imaging of the medium.

However, during NMR logging operations, echo trains may be distorted due to the movement of an NMR logging tool as the NMR logging tool moves through a wellbore. NMR echo train distortions due to tool motion during NMR measurement operations, such as LWD operations, cause loss of information regarding a formation being measured in an NMR logging operation. The loss of information may prevent a robust wellbore log from being created from NMR logging measurements.

BRIEF DESCRIPTION OF THE DRAWINGS

These drawings illustrate certain aspects of some examples of the present disclosure and should not be used to limit or define the disclosure.

DETAILED DESCRIPTION

Systems and methods described below are for a nuclear magnetic resonance (NMR) tool for use in a wellbore and a method for obtaining NMR data in the wellbore. Specifically, methods are disclosed for recovering lost information lost in NMR echo trains in accordance with particular embodiments. Lost information may be recovered after characterizing motion. Characterizing motion may be found utilizing an NMR tool. The NMR tool may be an oil well logging apparatus to measure NMR properties of earth formations in a subterranean region of interest. The NMR tool may include an antenna assembly, a magnet assembly, and/or any other number of sensors to determine motion of the NMR tool, acceleration of the NMR tool, displacement of the NMR tool, and/or the like.

Figure 1:
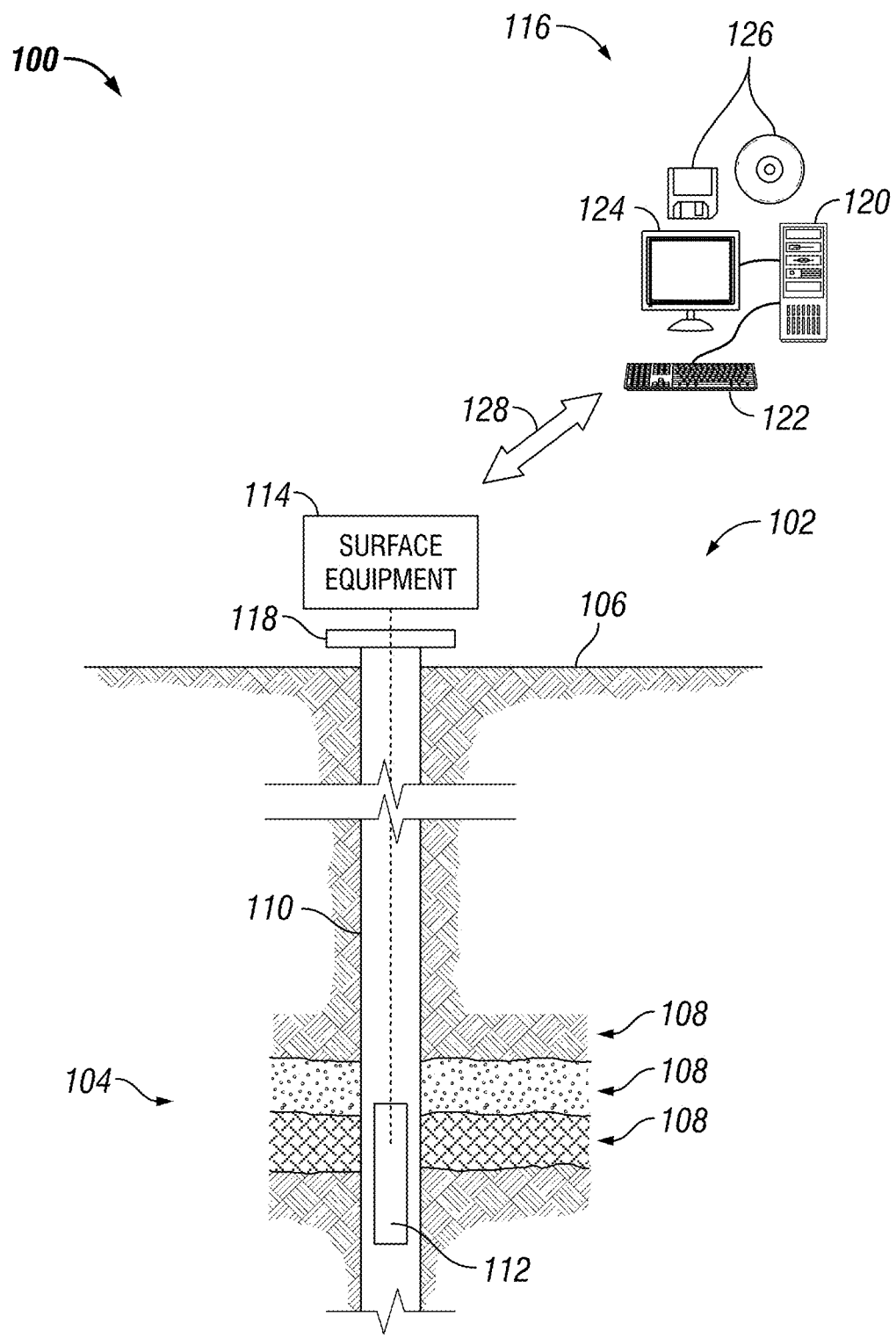
FIG. 1 illustrates an example of a well system.

FIG. 1 depicts a schematic view of an NMR logging operation deployed in and around a well system 100 in accordance with one or more implementations. Well system 100 may include an NMR logging system 102 and a formation 104 beneath the ground surface 106. Well system 100 may also include additional or different features that are not shown in FIG. 1. For example, well system 100 may include additional drilling system components, wireline logging system components, or other components.

Formation 104 may include all or part of one or more subterranean formations or zones. Formation 104 shown in FIG. 1, for example, includes multiple subsurface layers 108. Formation 104 may include sedimentary layers, rock layers, sand layers, or any combination thereof and other types of subsurface layers. One or more of the subsurface layers 108 may contain fluids, such as brine, oil, gas, or combinations thereof. A wellbore 110 may penetrate through the subsurface layers 108. Although wellbore 110 shown in FIG. 1 is a vertical wellbore, NMR logging system 102 may also be implemented in other wellbore orientations. For example, NMR logging system 102 may be adapted for horizontal wellbores, slant wellbores, curved wellbores, vertical wellbores, or any combination thereof.

NMR logging system 102 may also include a logging tool 112, surface equipment 114, and an information handling system 116. In FIG. 1, logging tool 112 is a downhole logging tool that operates while disposed in wellbore 110. Surface equipment 114 shown in FIG. 1 operates at or above surface 106, for example, near the well head 118, to control logging tool 112 and possibly other downhole equipment or other components of well system 100. Information handling system 116 receives and analyzes logging data from logging tool 112 through a connection 128. Connection 128 may be a wired and/or wireless connection between information handling system 116 and NMR logging system 102. Information handling system 116 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 116 may be a processing unit 120, a network storage device, or any other suitable device and may vary in size, shape, performance, functionality, and price. Information handling system 116 may include random access memory (RAM), one or more processing resources such as a central processing unit (CPU) or hardware or software control logic, ROM, and/or other types of nonvolatile memory. Additional components of information handling system 116 may include one or more disk drives, one or more network ports for communication with external devices as well as an input device 122 (e.g., keyboard, mouse, etc.) and video display 124. Information handling system 116 may also include one or more buses operable to transmit communications between the various hardware components.

Alternatively, systems and methods of the present disclosure may be implemented, at least in part, with non-transitory computer-readable media 126. Non-transitory computer-readable media 126 may include any instrumentality or aggregation of instrumentalities that may retain data and/or instructions for a period of time. Non-transitory computer-readable media 126 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

All or part of information handling system 116 may be implemented as a component of; or integrated with one or more components of, surface equipment 114, logging tool 112, or both. For example, information handling system 116 may be implemented as one or more computing structures separate from but communicative with the surface equipment 114 and logging tool 112.

Without limitation, information handling system 116 may be embedded in the logging tool 112 (not shown), and information handling system 116 and logging tool 112 may operate concurrently while disposed in wellbore 110. For example, although information handling system 116 is shown above surface 106 in FIG. 1, all or part of information handling system 116 may reside below surface 106, for example, at or near the location of logging tool 112.

Well system 100 may include communication or telemetry equipment that allows communication among information handling system 116, logging tool 112, and other components of NMR logging system 102. For example, each of the components of NMR logging system 102 may include one or more transceivers or similar apparatus for wired or wireless data communication among the various components. NMR logging system 102 may include, but is not limited to, one or more systems and/or apparatus for wireline telemetry, wired pipe telemetry, mud pulse telemetry, acoustic telemetry, electromagnetic telemetry, or any combination of these and other types of telemetry. In some embodiments, logging tool 112 receives commands, status signals, or other types of information from information handling system 116 or another source. Information handling system 116 may also receive logging data, status signals, or other types of information from the logging tool 112 or another source.

NMR logging operations may be performed in connection with various types of downhole operations at various stages in the lifetime of a well system and therefore structural attributes and components of the surface equipment 114 and logging tool 112 are adapted for various types of NMR logging operations. For example, NMR logging may be performed during drilling operations, during wireline logging operations, or in other contexts. As such, the surface equipment 114 and logging tool 112 may include or operate in connection with drilling equipment, wireline logging equipment, or other equipment for other types of operations.

Figure 2:
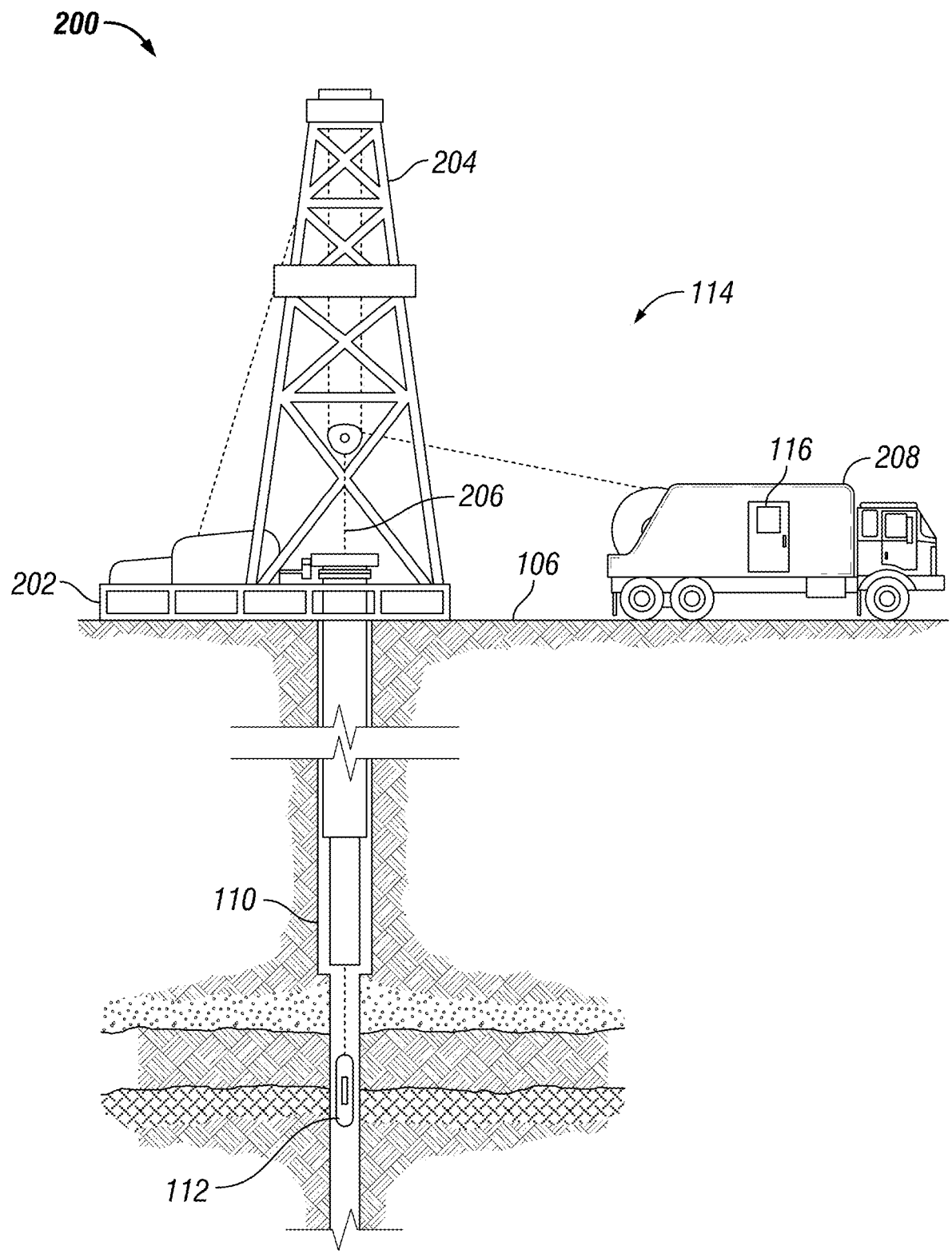
FIG. 2 illustrates an example of a logging while drilling (LWD) system.

FIG. 2 depicts a schematic view of a wireline NMR logging operation deployed in and around a well system 200 in accordance with one or more implementations. Well system 200 may include NMR logging tool 112 in a wireline logging environment. Surface equipment 114 may include, but is not limited to, a platform 202 disposed above surface 106 equipped with a derrick 204 that supports a wireline cable 206 extending into wellbore 110. Wireline logging operations are performed, for example, after a drill string is removed from the wellbore 110, to allow logging tool 102 to be lowered by wire line or logging cable into wellbore 110. Information handling system 116 may attach to logging tool 112 through wireline 206 within a vehicle 208.

Figure 3:
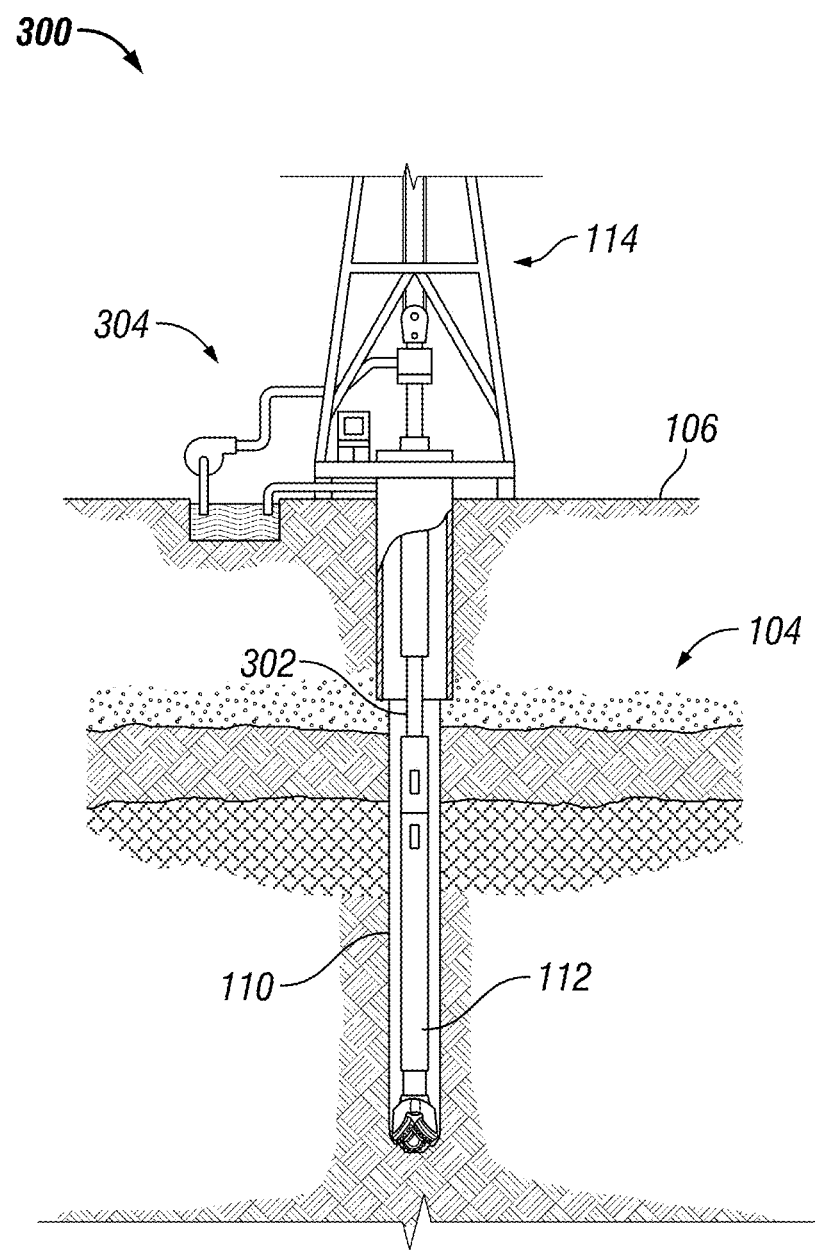
FIG. 3 illustrates an example of a measuring which drilling (MWD) system.

FIG. 3 depicts a schematic view of a well system 300 that includes NMR logging tool 112 in a logging while drilling (LWD) environment in accordance with one or more implementations. NMR logging operations may be performed during drilling operations. Drilling may be performed using a string of drill pipes connected together to form a drill string 302 that may be lowered through a rotary table into wellbore 110. A drilling rig 304 at surface 106 may support the drill string 302, as drill string 302 may operate to drill a wellbore 110 penetrating formation 104. Drill string 302 may include, for example, but is not limited to, a kelly, a drill pipe, a bottom hole assembly, and other components. The bottom-hole assembly on the drill string may include drill collars, drill bits, NMR logging tool 112, and other components. Exemplary logging tools may be or include, but are not limited to, measuring while drilling (MWD) tools and LWD tools. NMR logging tool 112 may obtain NMR measurements from the subterranean region 104. As shown, for example, in FIGS. 1-3, NMR logging tool 112 may be suspended in wellbore 110 by a coiled tubing, wireline cable, or another structure or conveyance that connects the tool to a surface control unit or other components of the surface equipment 114.

NMR logging tool 112 may be lowered to the bottom of a region of interest and subsequently pulled upward (e.g., at a substantially constant speed) through the region of interest. As shown, for example, in FIG. 3, NMR logging tool 112 may be deployed in wellbore 110 on jointed drill pipe, hard wired drill pipe, or other deployment hardware. In other example implementations, NMR logging tool 142 collects data during drilling operations as it moves downward through the region of interest. NMR logging tool 112 may also collect data while drill string 302 may be moving, for example, while NMR logging tool 112 may be being tripped in or tripped out of wellbore 110.

NMR logging tool 112 may also collect data at discrete logging points in wellbore 110. For example, NMR logging tool 112 moves upward or downward incrementally to each logging point at a series of depths in wellbore 110. At each logging point, instruments in NMR logging tool 112 may perform measurements on formation 104. NMR logging tool 112 may also obtain measurements while NMR logging tool 112 may be moving (e.g., being raised or lowered). The measurement data may be communicated to information handling system 116 for storage, processing, and analysis. Such data may be gathered and analyzed during drilling operations (e.g., LWD operations), during wireline logging operations, other conveyance operations, or during other types of activities.

Information handling system 116 may receive and analyze the measurement data from NMR logging tool 112 to detect properties of various subsurface layers 108. For example, information handling tool 116 may identify the density, material content, and/or other properties of subsurface layers 108 based on NMR measurements acquired by NMR logging tool 112 in wellbore 110.

NMR logging tool 112 may obtain NMR signals by polarizing nuclear spins in formation 104 and pulsing the nuclei with a radio frequency (RF) magnetic field. Various pulse sequences (e.g., series of radio frequency pulses, delays, and other operations) may be used to obtain NMR signals, including the Carr Purcell Meiboom Gill (CPMG) sequence (in which the spins are first tipped using a tipping pulse followed by a series of refocusing pulses), a saturation recovery pulse sequence, and other pulse sequences.

Figure 4:
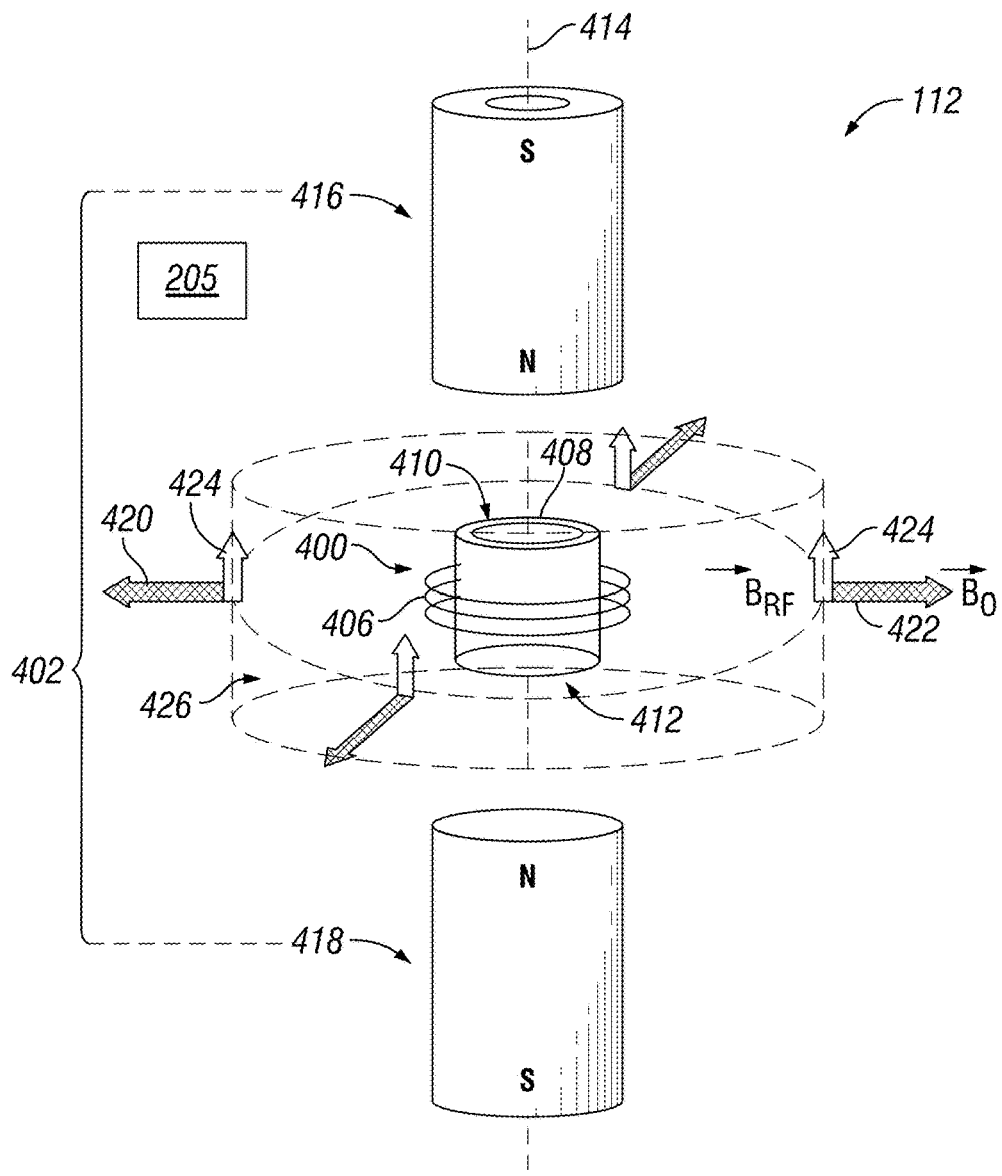
FIG. 4 illustrates an example of an NMR logging tool.

FIG. 4 depicts a schematic view of an NMR logging tool 112 at different intervals of use in accordance with one or more implementations. NMR logging tool 112 may include, but is not limited to, one or more antenna assemblies 400, one or more magnet assemblies 402, and one or more compensating assemblies 404. In one or more embodiments, NMR logging tool 112 may be used in wellbore 110 (e.g., referring to FIGS. 1-3) with any or all components of the well systems 100, 200, or 300, (e.g., referring to FIGS. 1-3) as discussed and described above.

Antenna assembly 400 may include one or more antenna windings 406 at least partially or completely wound, disposed, or positioned circumferentially around a soft magnetic core 408 (e.g., three antenna windings 406 are depicted in FIG. 4). Soft magnetic core 408 may contain one, two, or more permanent magnets positioned therein (not shown). In examples, soft magnetic core 408 may include an upper axial end 410 opposite a lower axial end 412. The upper and lower axial ends 410, 412 are axially aligned about a common axis 414 of NMR logging tool 112.

Figure 5:
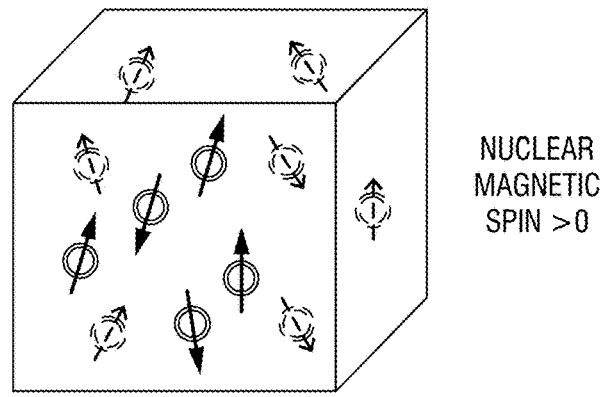
FIG. 5 illustrates an example of non-zero nuclear magnetic spin.

Magnet assembly 402 may include at least two end magnets, such as an upper end magnet 416 and a lower end magnet 418. Upper end magnet 416 may be spaced apart from upper axial end 410 of soft magnetic core 408 and may be axially aligned about common axis 414. Lower end magnet 418 may be spaced apart from lower axial end 412 of soft magnetic core 408 and may be axially aligned about common axis 414. The north poles of end magnets 416, 418 are facing toward the antenna assembly 400, as depicted in FIGS. 4-6. Antenna assembly 400 and magnet assembly 402 may produce or generate a static magnetic field (represented by arrows 420, 422) and a radio-frequency magnetic field (represented by arrows 424) within a volume 426 (e.g., volume of investigation) in a subterranean region.

Figure 6C:
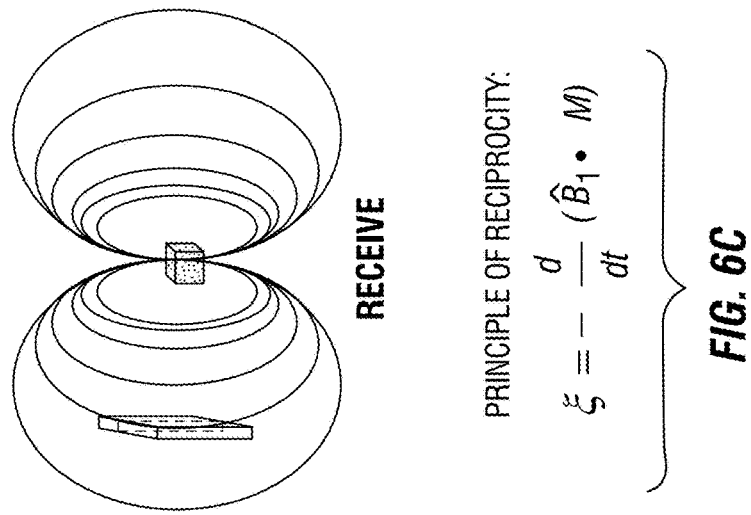
FIG. 6C illustrates a signal received from the excited nuclear spins.

NMR logging tool 112 during NMR measurement operations may function with non-zero nuclear magnetic spin represented in FIG. 5. When placed in a magnetic field the magnetic spins tend to align more towards that magnetic field than not, according to the Boltzmann distribution as shown in FIG. 6A. This magnetic field traditionally may be referred to as the "main magnetic field" or the "static field" as it may be independent of time and may be given the symbol $B_0$. The bulk effect of nuclear magnetic spin alignment is called the magnetization and given the symbol M. It may be thought of as mini localized magnetic fields.

Figure 6B:
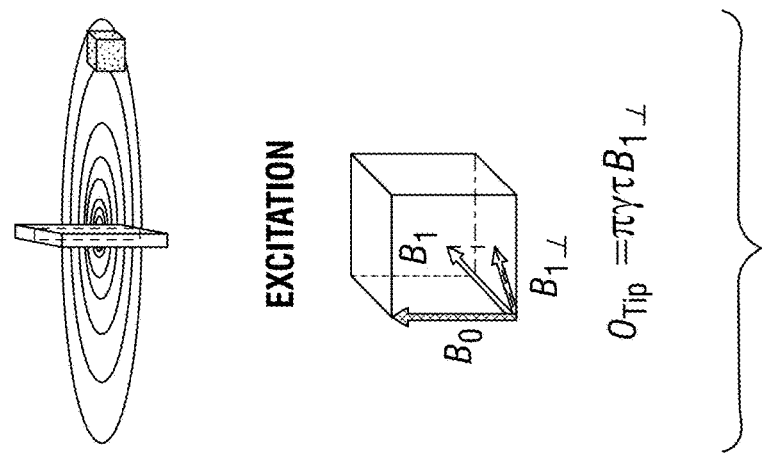
FIG. 6B illustrates a second time-varying magnetic field applied as an excitation.
Figure 6A:
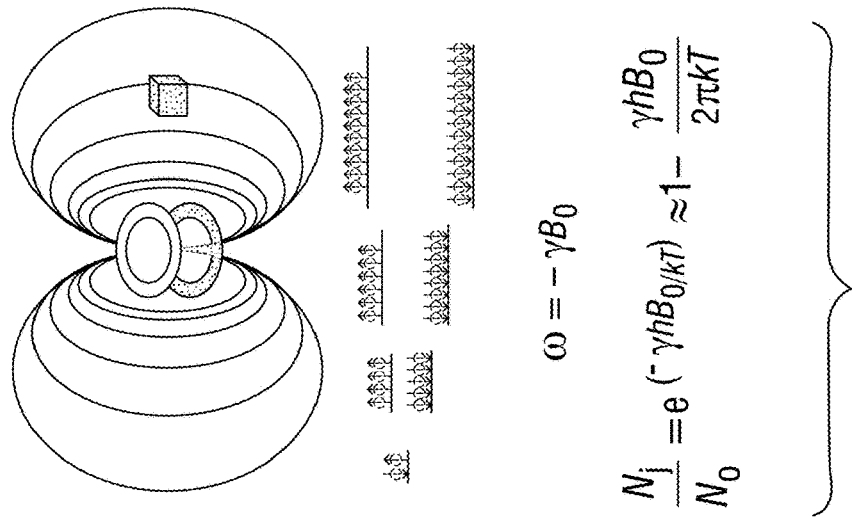
FIG. 6A illustrates a magnetic spin aligning with a magnetic field.

A second time varying magnetic field may also be applied as shown in FIG. 6B. That field is designated as $B_1$ (also called the "radio frequency field") and may be turned on and off at different increments, known as a pulse or a signal. The pulse or the signal may be transmitted from a radio frequency transmitter. This magnetization excitation results in a tip angle, $\theta_{Tip}$. The $B_1$ magnetic field in the majority of NMR experiments may be created by a coil, called an antenna, and may be powered by an electromagnetic transmitter.

Figure 7:
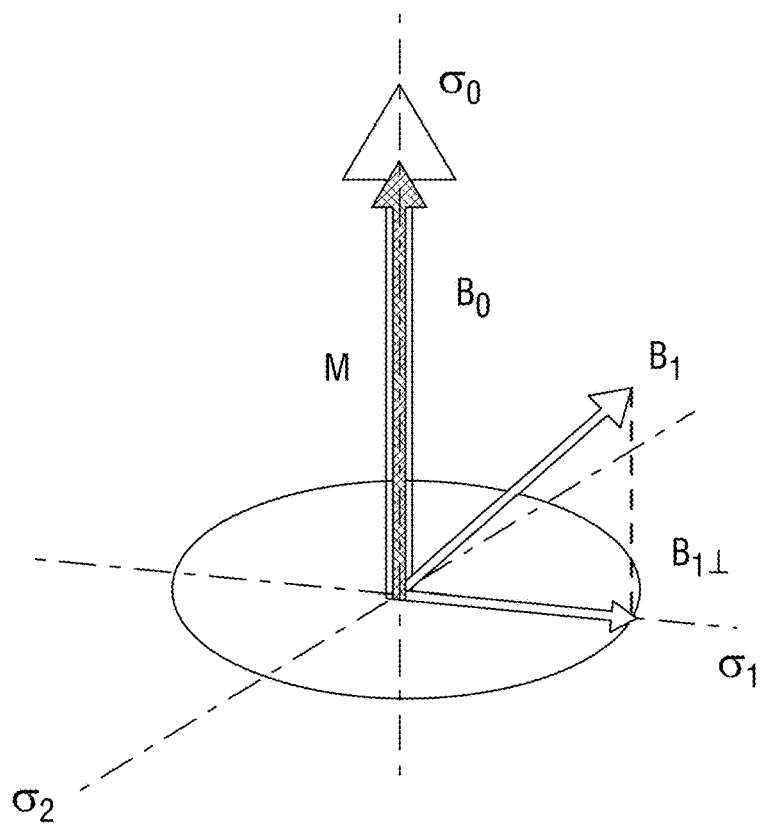
FIG. 7 illustrates the interactions of a static magnetic field and a radio frequency field magnetic field.
Figure 8:
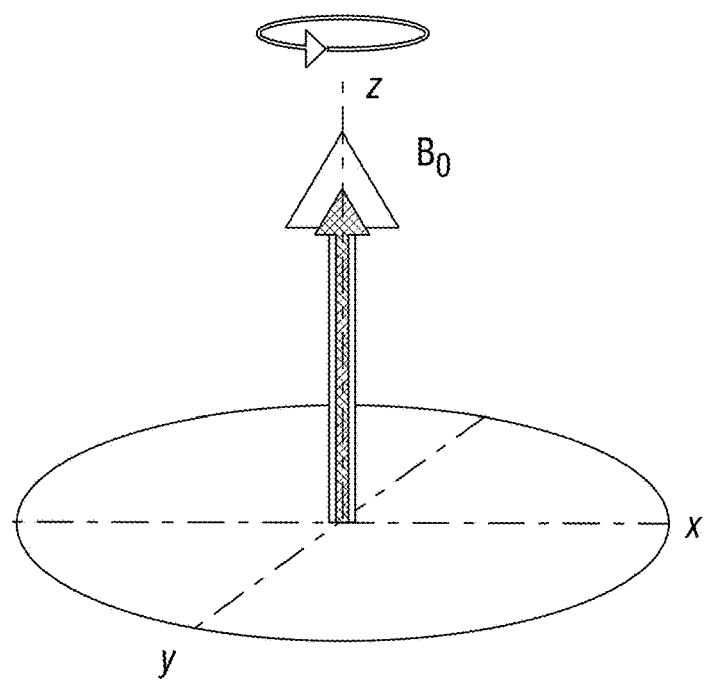
FIG. 8 illustrates a system in equilibrium with the magnetization aligned with a static magnetic field and rotating on its axis around the direction of the static magnetic field.

NMR measurement operations depend on the nuclear spins (the object of interest) interaction with the $B_1$ and $B_0$ as shown in FIG. 7. The $B_0$ direction at any point dominates the interaction when $B_0 \gg B_1$, which may be the case for downhole tools. This means only portions perpendicular to $B_0$ will matter for $B_1$. The last part of NMR measurements may be to receive a signal from the excited nuclear spins. This happens according to the principle of reciprocity as shown in FIG. 6C, as the nuclear spins act as mini transmitting coils. The system in equilibrium will look something like that of FIG. 8. The local magnetization may be aligned with the local $B_0$ magnetic field and rotates on its axis around the $B_0$'s direction.

Figure 9:
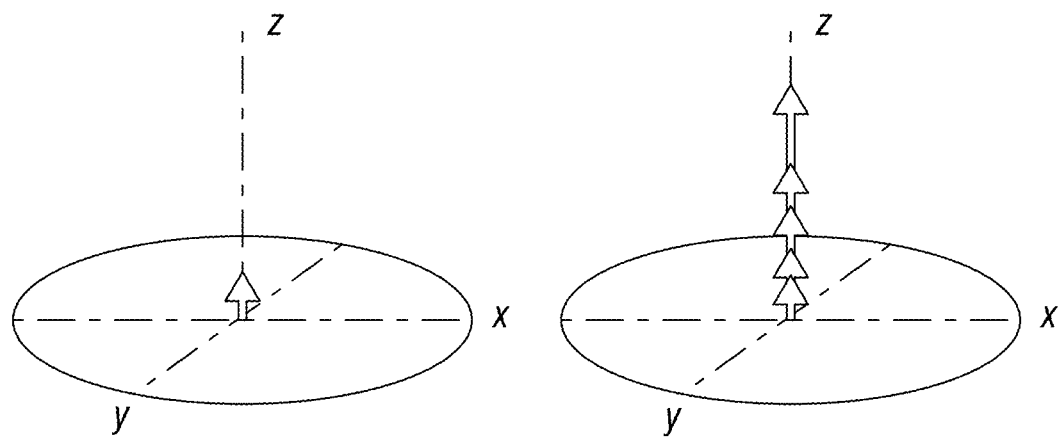
FIG. 9 illustrates two characteristics of magnetization.
Figure 9:
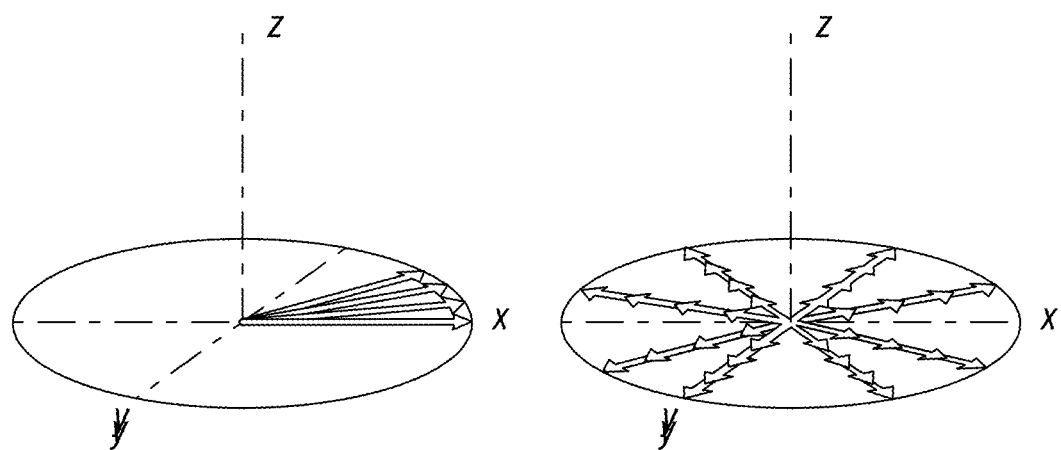

The received data, in contemporary downhole experiments, reveals two characteristics of the magnetization: longitudinal recovery (T1) and transverse relaxation (T2) shown in FIG. 9. Since the magnetic fields in logging tools have inhomogeneities greater than the parts per a million, which may be required to reveal Larmor frequencies of different nuclear active sites, the distinguishing chemical properties that may be found are only T1, T2, and sometimes a diffusion coefficient (D).

Both of these measurements require the magnetization to be perturbed from its equilibrium state, alignment with the static field. These are measurements of the magnetization relaxation rates to equilibrium from the perturbed states in the direction parallel and perpendicular to the $B_0$ field.

The magnetization may be manipulated in order to cause the perturbation by the $B_1$ such that the measurements above for $T_1$ and $T_2$ may be made. Two specific manipulations are the main focus of most NMR experiments downhole. Other more complicated manipulations (rotation) are possible and may be useful, but only the two specific manipulations are discussed, since they are the most common. The first manipulation may be a manipulation such that the magnetization is in the perpendicular plane, commonly called a "90" or "π/2" pulse. The second manipulation may be an "inversion," which may cause the magnetization to point in the opposing direction. From equilibrium, the opposing direction would be in the anti-parallel direction. This pulse may be commonly referred to as a "180" or "π" pulse. By timing the pulse length, or changing its amplitude, the magnetization may be rotated any amount.

Figure 10:
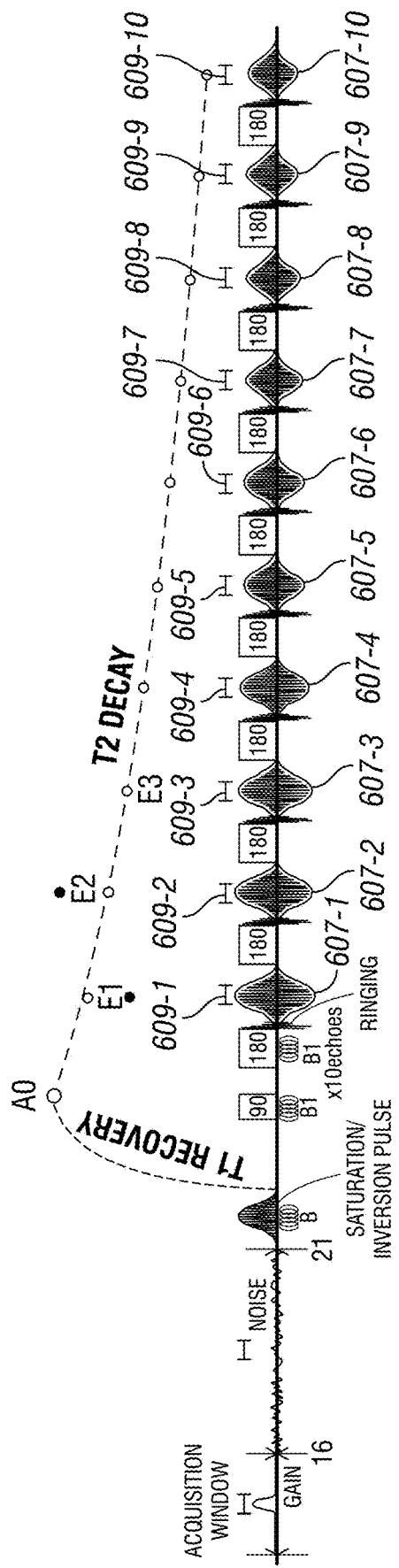
FIG. 10 illustrates an echo train.

The $T_2$ of the formation may be influenced by the formation and gradient of the tool. If a free induction decay (FID) were measured, the $T_2$ calculated would not be the intrinsic $T_2$, but a modified one known as $T_2^*$. A truer $T_2$ may be achieved point by point by refocusing the magnetization with a sequence of 180 pulses, this $T_2$ may be subjugated to irreversible losses, e.g., due to diffusion and formation surface effects. The FID is then known as an echo FID. The Echo FID may be integrated to give a single value (called an echo), and a series of echoes form an NMR echo train. FIG. 10 is a representation of this sequence, which may be known as the Carr, Purcell, Meiboom and Gill sequence (CPMG).

NMR echo trains are distorted due to tool motion during NMR measurement operations, such as LWD operations, which causes loss of information about formation 104 (e.g., referring to FIGS. 1-3). Corrections that partially recover information may be possible by adequately characterizing the motion, but such characterization may be difficult because echo-train distortion depends on tool velocity rather than the typically measured quantities of displacement and acceleration.

Echo-train distortion due to motion of NMR logging tool 112 (e.g., referring to FIG. 2) may be prevalent during LWD operation. Addressing echo-train distortion may begin with measuring and determining amplitude magnitude of NMR logging tool 112 motion and the change in size of the spatial region where effective spin flips occur as the bandwidth of refocusing pulses may be increased during the echo train. Optimization may occur based on the bandwidth selected for the excitation pulse and initial refocusing pulse, the available power, and the choice of pulse shapes.

At the beginning of an echo train, the excitation pulse and the first refocusing pulse together select a spatial region in the formation where spin motion may be refocused and contributes to the NMR signal. As NMR logging tool 112 (e.g., referring to FIG. 2) moves during the echo train, the NMR frequency distribution within this spatial region changes, leading to distortion of the echo train. One of the main factors responsible for this distortion may be lack of effective spin flips by RF pulses, due to the shifts in NMR frequency in this spatial region.

Conventional designs for pulse sequences may be modified to improve the effectiveness of spin flips by RF pulses during NMR logging tool 112 (e.g., referring to FIG. 2) motion. For example, if the bandwidth of refocusing pulses may be increased during the course of the echo train, the pulses may give effective spin flips even after the NMR frequencies of spins have shifted due to NMR logging tool 112 motion. The shape, duration, and/or RF power of refocusing pulses may be modified during an echo train in order to give the optimal balance between the competing demands of minimizing echo-train distortion and avoiding excessive power consumption. For example, modification may be in the form of increasing or decreasing duration, the RF power may be increased or decreased, and the shape may be programmed into NMR logging tool 112. Without limitation, shorter pulses have greater bandwidth than longer pulses. By increasing RF power, this may allow the duration of the RF pulse to be decreased, thereby increasing the bandwidth. In general, detailed simulations may illustrate changes in the shape of a pulse and how it may affect the bandwidth, as the shape may have significant effects on the bandwidth.

Increasing the bandwidth of refocusing pulses during an echo train may also give information about the tool motion occurring during the train. In the absence of motion from NMR logging tool 112 (e.g., referring to FIG. 2), the frequency components of each echo are essentially identical. But when motion is occurring and spins are being effectively flipped by RF pulses, the frequency components of echoes may change in a way that may be determined by the motion of NMR logging tool 112. The variation in the frequency components of echoes during a train may be compared to simulations of different types and frequencies of motion using detailed models of fields created by NMR logging tool 112. Thus, the motion of NMR logging tool 112 occurring during an echo train may be characterized.

During NMR operations, an estimate of the amplitude and characteristic time scale of the motion of NMR logging tool 112 (e.g., referring to FIG. 2) may be known. Previously used and recorded amplitudes in other NMR operations in conjunction with the previously recorded time scale characteristics may help in predicting motion of NMR logging tool 112 during NMR logging operations. For example, the estimate of the characteristic time scale determines how long during operations before an increase in bandwidth of the refocusing pulses may be needed. If no estimates are known then a maximum bandwidth may be utilized with a first refocusing pulse, however this would consume RF power and may shorten operation. Estimating amplitude and characteristic time scales may allow for the estimate of tool movement before NMR logging operations. This may allow for a user to predict when to increase the pulse bandwidth to correct for motion artifacts. It may also allow a user to reduce power consumption by not increasing the pulse bandwidth before NMR logging tool 112 has had a chance to move significantly. For instance, power may be conserved by not increasing the pulse bandwidth for the first 300 microseconds of the NMR echo train because significant motion may not occur during the first 300 microseconds of the NMR echo train. Therefore, estimates that takes account of accelerator and/or displacement measurements made during previous drilling jobs, as well as details of the planned drilling job such as drill type and rate of penetration ("ROP") may allow a user to plan out current NMR logging operations, which may allow the user to converse RF power.

For a given range of the amplitude and time scale of motion for NMR logging tool 112 (e.g., referring to FIG. 2), detailed modeling of spin dynamics may be used to determine how the bandwidth of refocusing pulses may be adjusted during a pulse sequence in order to give effective spin flips throughout the echo train. A detailed modeling of spin dynamics includes the motion or evolution of spins of nuclei in response to magnetic fields that each nuclei experience. As NMR logging tool 112 moves, the fields experienced by the nuclei are affected by the motion of NMR logging tool 112, which may change the spin evolution of each nuclei. Modeling simulates the spin evolution in response to the changing magnetic field, and from this spin evolution, an NMR signal may be calculated. The simulation may be performed based on the equations that govern the evolution of spins in a changing magnetic field. For a given instance of tool motion, spin-dynamic modeling may be used to determine what modification of the refocusing pulse bandwidth would be needed during a pulse sequence in order to yield an undistorted NMR signal, i.e., a signal with the same distribution of decay times that would have been measured if NMR logging tool 112 is not moving. By performing such modeling for a variety of tool motions, modifications to the pulse bandwidth may be determined that prevent artifacts due to motion of NMR logging tool 112 during logging. Additionally, spin-dynamics simulations may be used to find what modifications to receiver bandwidth may be needed to suppress tool artifacts due to motion of NMR logging tool 112 during logging operations. The spatial region in the formation selected by the combination of the excitation pulse and the first refocusing pulse corresponds to a particular measurement bandwidth. This bandwidth may typically be designed to be smaller than the maximum bandwidth available for refocusing pulses. In examples, there may be a tradeoff between the need to make the selected spatial region (and bandwidth) large enough to give good signal to noise ratio (SNR), and the need to reserve the capability to increase the bandwidth of refocusing pulses during the echo train. The increase in bandwidth needed to give effective spin flips throughout the echo train depends on the amplitude of motion of NMR logging tool 112.

Spin-dynamics modeling that includes detailed models of the tool fields may be used to set the initial measurement bandwidth as well as the maximum bandwidth of the refocusing pulses. The estimate of the characteristic time scale of the motion of NMR logging tool 112 may be used to set the rate of change of the refocusing-pulse bandwidth, from the initial value to the final maximum value. In setting this rate of change, there may be a tradeoff between the goal of minimizing power consumption during the initial part of the echo train (since refocusing pulses with increased bandwidth may require increased RF power) and the goal of ensuring that refocusing pulses give effective spin flips throughout the echo train.

During NMR measurement operations, the bandwidth of the refocusing pulses may be increased during the echo train by using shorter pulses of increased RF power. As the bandwidth of refocusing pulses may be increased, the bandwidth of the filter used during signal acquisition may correspondingly be increased. (The bandwidth of this filter may be considered the measurement bandwidth.) When motion from NMR logging tool 112 is occurring, the distribution of NMR frequencies within the spatial region responsible for an NMR signal may be modified by the motion of NMR logging tool 112. As a result, the frequency components of echoes may be modified. For example, echoes may contain frequency components outside of the initial bandwidth determined by the combination of the excitation pulse and the first refocusing pulse.

As NMR logging tool 112 (e.g., referring to FIG. 2) moves, spins on the border move away from the frequency range of the refocusing pulses if the bandwidth remains constant. However, when the bandwidth may be increased continually more of the spins that would otherwise have been removed from the frequency range of the refocusing pulses are included, thus keeping more of the signal active than otherwise may be present. The signal may be acquired in a waveform, which may then filtered and integrated to a signal value. Those values for each echo compose the echo train. The echo train, which may be converted into either a T2, T1, or D time domain spectra, may only be concerned with the amount of signal for each echo not the frequency at which the echo was acquired. In this way broadening the bandwidth of the refocus and acquisition retains a truer echo train than the standard echo train with constant bandwidth refocusing pulses.

As the measurement bandwidth may be increased during the echo train in order to detect all frequency components of the echoes, the modified frequency content of the echoes may be used to characterize the motion of NMR logging tool 112. In the case where a directionally sensitive receiver may be available, motion of NMR logging tool 112 along the receiver's sensitive axis may have a characteristic signature. For example, signatures may include broadening of the echo bandwidth, with greater amplitude on one end of the bandwidth than on the other side. For example, if the receiver is sensitive along the +/−x axis, then motion of NMR logging tool 112 along +x direction may increase both the NMR frequency and the receiver sensitivity in the +x direction, while decreasing the NMR frequency and the receiver sensitivity in the −x direction. The changes in frequency and receiver sensitivity in the +x direction may be due to the fact that the tool motion brings the source of the magnetic field and the receiver itself, respectively, closer to the part of the formation lying in the +x direction.

Analysis of the frequency components of the echoes of a train within the increased measurement bandwidth, together with spin dynamics modeling that includes detailed models of the fields created by NMR logging tool 112 (e.g., referring to FIG. 2), may be used to characterize the motion of NMR logging tool 112. In the case where the motion of NMR logging tool 112 may be independently measured during the echo train, the characterization of motion given by the method as disclosed furnishes a check on the reliability of the measured motion of NMR logging tool 112.

In examples, while the measurement bandwidth may be increased in order to ensure that all frequency components of the echo are captured, SNR may be improved with an additional step of filtering that excludes noise outside of the frequency components present in the echoes during a particular part of the echo train. In the case where the motion of NMR logging tool 112 has been independently measured, the record of motion and a model of the field created by NMR logging tool 112 may be used to find the optimal matched filter for increasing during each part of the echo train. When an independent measurement of motion for NMR logging tool 112 is not available, a running average of a few echoes may be used to improve the accuracy of finding the frequency components of the signal. With this improved accuracy, an optimal matched filter may be selected to reduce noise without filtering out the NMR signal.

In an additional method, during NMR measurement operations increasing the bandwidth of refocusing pulses using shaped or composite pulses may be utilized rather than shorter pulses of greater RF power. Additionally, this may conserve RF power for only a fraction of the echo trains, particularly trains designed to detect long T2 relaxation times. The characterization of motion of NMR logging tool 112 obtained using this method for long echo trains may be used to enable processing that reduces the effects of motion of NMR logging tool 112 for the remaining trains, e.g., motion corrections.

As described above, systems and method may involve increasing the bandwidth of refocusing pulses during the course of an echo train. Additional, systems and methods may involve modifying the bandwidth of refocusing pulses during the course of an echo train. For instance, if the bandwidth of refocusing pulses may be decreased during the course of an echo train, the echo train could give information the susceptibility to motion effects within a particular frequency range.

As discussed above, NMR echo trains are distorted due to motion of NMR logging tool 112 (e.g., referring to FIG. 2) during LWD, which may cause loss of information about formation 104 (e.g., referring to FIG. 1). Separation of undistorted contributions to the signal from the distorted contributions may be needed in order to extract the petrophysical information present in the NMR data. At the beginning of an echo train, the excitation pulse and the first refocusing pulse together select a spatial region in the formation where spin motion may be refocused and contributes to the NMR signal. As of NMR logging tool 112 moves during the echo train, the NMR frequency distribution within this spatial region changes, leading to distortion of the echo train.

However, the distortion does not occur uniformly within this spatial region or within the bandwidth of the NMR measurement. Spins near the edges of the spatial region are also initially near the limits of the frequency range where the RF pulses used for the measurement may effectively flip spins. A relatively small motion of NMR logging tool 112 (or, equivalently, a relatively small shift in the Larmor frequency) may push such spins out of the bandwidth of the RF pulses and distort or destroy their contribution to the NMR signal. For spins that are initially in the central region of the pulse bandwidth, a small shift in the Larmor frequency causes minimal signal distortion, because the frequency shift leaves the spins within the pulse bandwidth, where spin flips due to RF pulses are effective.

Frequency-domain processing of the NMR signal, either during or after signal acquisition, may be used to suppress contributions to the signal at frequencies where distortion may be severe, while preserving contributions at frequencies where distortion may be minimal. Without limitation, frequency-domain processing is defined as a modification of the phase and amplitude of different frequency components in order to suppress distorted contributions to the NMR signal. In examples, the amplitude of frequency components are set to zero outside of a given bandwidth. Additionally, the bandwidth may be limited by a matched filter that may be used for each frequency band. This may be done by changing the shape or window used in the matched filter. For example, a window that may be broader in the time domain selects frequencies from a narrower bandwidth, effectively decreasing the bandwidth of the receiver. Additionally, for frequency-domain processing, NMR logging measurements typically use a matched filter applied during signal acquisition in order to minimize noise. Given estimates of the amplitude and characteristic time scale of motion of NMR logging tool 112 expected during an echo train, the filter applied during signal acquisition may be narrowed during the echo train to take account of the fact that distortion may be expected to appear first near the edges of the frequency band. Provided the amplitude of the motion may not be large enough to distort the NMR signal throughout the measurement bandwidth, optimized filtering could isolate the undistorted contributions to the signal during a long echo train, allowing for measurement of a broad T2 distribution.

Measurement of motion of NMR logging tool 112 (e.g., referring to FIG. 2) during a period of logging may not be a prerequisite for using frequency-domain processing to select the undistorted component of the NMR signal. If reliable estimates of the expected amplitude and characteristic time scale of motion are available before logging, the frequency-domain processing during the course of an echo train may be designed to suppress contributions to the signal at frequencies where distortion may be possible. However, reliable estimates of the amplitude may not be needed for frequency domain processing. During frequency domain processing, an upper limit on the typical amplitude of motion of NMR tool 112 may be found. This upper limit determines a range of frequencies in which the signal may become distorted. From this upper limit frequencies identified that may provision distortion can be filtered out or suppressed. A reliable estimate may filter out the frequencies in which motion actually does introduce distortions. Similarly, it may not be necessary to have a reliable estimate of the characteristic time scale of the motion. The value of such an estimate may be that it prevents filtering out certain frequencies before distortions may appear at those frequencies. Without a reliable estimate of the characteristic time scale a full filtering to all echoes may be applied.

In cases where motion of NMR logging tool 112 may be measured or characterized during a period of logging, the frequency-domain processing may be more tightly optimized to exclude only the frequencies for which distortion occurred during the train.

Previous estimates of the amplitude and characteristic time scale of the motion of NMR logging tool 112 (e.g., referring to FIG. 2) may be used. For example, estimates that take account of accelerator and/or displacement measurements made during previous drilling jobs, as well as details of the planned drilling job such as drill type and ROP.

For a given range of the amplitude and time scale of motion of NMR logging tool 112 (e.g., referring to FIG. 2), detailed modeling of spin dynamics may be used to determine how the frequency-domain processing applied to the signal may be adjusted during a pulse sequence in order to suppress distortion in the echo train. The amplitude of motion from NMR logging tool 112 may determine the minimum bandwidth within which signal contributions may be undistorted. For example, the excitation pulse and initial refocusing pulse select the set of frequencies that may be included in the NMR signal to be measured. Motion of NMR logging tool 112 initially causes distortion in frequencies components that are near the edges of the measurement bandwidth. If the amplitude of the motion may be too large, distortions will occur at all frequencies. However, if the measurement bandwidth may be sufficiently wide, then there will be a region of the measurement bandwidth where no distortions occur. (This may be because a wider measurement bandwidth for the signal corresponds to a signal originating from a wider spatial region.) This range of frequencies is defined as the "minimum bandwidth" within which signal contributions are undistorted. The time scale of motion from of NMR logging tool 112 may determine the rate at which the bandwidth of the filtered echo train may be decreased from the initial measurement bandwidth to the minimum bandwidth determined by the amplitude of tool motion.

If the time-domain NMR signal may be stored during logging, the filtering performed during signal acquisition may not be modified during the course of the echo train. In examples, rather than separating undistorted contributions to the signal from distorted contributions, the filtering during signal acquisition may simply suppress noise outside of the initial measurement bandwidth. In this case, the filtering that separates undistorted and distorted contributions may be performed as post processing. In particular, storing the time-domain signal enables applying frequency-domain processing based on any estimate of the amplitude and time scale of motion for NMR logging tool 112 (e.g., referring to FIG. 2) may be of interest. However, the need to store the time-domain NMR signal may be suppressed by applying frequency-domain processing based on a series of estimates of amplitude/time scale during signal acquisition and storing only the resulting echo trains.

Regardless of whether the processing may be applied during signal acquisition or as post processing, the results of applying processing based on different estimates of the amplitude and time scale of motion may be compared. The amplitude of the motion of NMR logging tool 112 (e.g., referring to FIG. 2) may be characterized by finding the maximum amplitude A that gives a significant change in the echo train when frequency-domain processing, appropriate for motion of NMR logging tool 112, of amplitude A may be applied. Similarly, the time scale of the motion may be characterized by finding the minimum time scale T that gives a significant change in the echo train when frequency-domain processing appropriate for motion of NMR logging tool 112 of amplitude T may be applied.

A feature of this method may be that it includes a way of checking the accuracy of the estimates of motion for of NMR logging tool 112 (e.g., referring to FIG. 2) using designed filtering. This checking, or quality control, may be done by applying frequency-domain processing based on a series of estimates of the amplitude and time scale of motion of NMR logging tool 112. If a given estimate of the amplitude is accurate, for instance, then applying filtering appropriate for a larger amplitude of motion from NMR logging tool 112 may not suppress any additional distorted contributions to the echo train. Without limitation, the filtering based on both the larger and the smaller estimated amplitude of motion from NMR logging tool 112 may suppress the same distorted contributions to the echo train, and so the two filtering processes may yield similar echo trains. However, if the estimated amplitude of motion of NMR logging tool 112 may be smaller than the true amplitude, then filtering based on a larger estimated amplitude may suppress additional distorted contributions to the echo train. Without limitation, the filtering based on the larger and the smaller estimated amplitude of tool motion may yield significantly different echo trains. By applying frequency-domain processing based on a series of estimates of the amplitude and time scale of motion of NMR logging tool 112 and the finding the maximum value of amplitude and minimum value of time scale that give significant changes in the echo train, the motion of NMR logging tool 112 may be characterized.

Systems and methods described above suppress contributions to the signal at frequencies where distortion, due to motion, may be expected based on estimates of the amplitude and time scale of the motion of NMR logging tool 112 (e.g., referring to FIG. 2). In examples, general frequency-domain processing that modifies the phase and amplitude of different frequency components in order to separate distorted from undistorted contributions to the NMR signal may be incorporated. Additionally, different weightings may be applied at different frequencies, with nonzero weightings applied at frequencies where some distortion may be expected. This could minimize the loss of SNR while also suppressing distortions to not significantly affect the distribution of relaxation times obtained from inversion.

Methods and system described above are improvements over current technology. Specifically, modifying refocusing pulses during the course of an echo train in order to reduce the effects of motion from NMR logging tool 112 (e.g., referring to FIG. 2) and using the increased measurement bandwidth of the modified refocusing pulses to characterize motion of NMR logging tool 112 by monitoring changes in the frequency content of echoes within the bandwidth. Additionally, improvements may also include using frequency-domain processing to separate NMR signal contributions distorted due to motion of NMR logging tool 112 from the signal contributions that have not been distorted, suppress echo-train distortions caused by motion of NMR logging tool 112 without requiring detailed measurement of tool motion during the echo train, and identifying the amplitude and time scale of the motion by applying different frequency-domain processing based on a series of estimated values of amplitude and time scale.

This method and system for correcting loss from distortion of an NMR measurement may use any of the various features of the compositions, methods, and system disclosed herein, including one or more of the following statements.

Statement 1: A method may comprise disposing a nuclear magnetic resonance logging tool into a wellbore. The nuclear magnetic resonance logging tool may comprise an electromagnetic transmitter configured to emit a magnetic field, a radio frequency transmitter configured to transmit a pulse, and a receiver configured to detect one or more frequencies from an echo train. The method may further comprise identifying an upper limit of an amplitude for tool motion, identifying a frequency range based at least in part on the upper limit of the amplitude for tool motion, measuring the one or more frequencies from the echo train, and performing a frequency-domain processing of the one or more frequencies to suppress distortions in an echo train.'

Statement 2: The method of statement 1, wherein the frequency-domain processing includes a matched filter Statement 3: The method of statements 1 or 2, further comprising decreasing a bandwidth of the receiver to suppress distortions in the echo train.

Statement 4: The method of statement 3, wherein the decreasing the bandwidth of the receiver comprises reducing the bandwidth of a matched filter.

Statement 5: The method of statement 3, wherein the decreasing the bandwidth is based at least in part on the characteristic time scale at which distortions develop in the echo train.

Statement 6: The method of statements 1-3, wherein the amplitude of the tool motion determines a minimum bandwidth of the receiver to detect the one or more frequencies.

Statement 7: The method of statements 1-3 or 6, wherein the frequency-domain processing further includes modifying a phase or an amplitude of the one or more frequencies for suppressing the distortions in the echo train.

Statement 8: The method of statements 1-3, 6, or 7, further comprising applying a frequency domain processing based on one or more estimated amplitudes of the tool motion for quality control.

Statement 9: The method of statement 8, further comprising applying a reduction in receiver bandwidth for a larger amplitude or a smaller amplitude than one or more estimated amplitudes of the tool motion.

Statement 10: The method of statements 1-3, 6, 7, or 8, further comprising modeling one or more spin dynamics.

Statement 11: A method may comprise disposing a nuclear magnetic resonance logging tool into a wellbore. The nuclear magnetic resonance logging tool may comprise an electromagnetic transmitter configured to emit a magnetic field, a radio frequency transmitter configured to transmit a pulse, and a receiver configured to detect one or more frequencies from an echo train. The method may further comprise moving the nuclear magnetic resonance logging tool in the wellbore, selecting a shape for one or more refocusing pulses, emitting the one or more refocusing pulses, increasing the bandwidth of the one or more refocusing pulse as the nuclear magnetic resonance logging tool moves in the wellbore, and recording one or more echoes.

Statement 12: The method of statement 11, further comprising increasing a bandwidth of the one or more refocusing pulses with one or more shorter pulses of increased radio frequency power.

Statement 13: The method of statements 11 or 12, further comprising modeling spin-dynamics of one or more nuclei.

Statement 14: The method of claim 13, further comprising characterizing motion of the nuclear magnetic resonance logging tool from the changes in frequency content based at least in part on the spin-dynamics model.

Statement 15: The method of statement 14, further comprising optimizing a rate at which pulse bandwidth is increased at one or more times during the one or more echoes and optimizing the shape of the one or more refocusing pulses.

Statement 16: The method of statements 11-13, further comprising estimating one or more amplitudes and a characteristic time scale of a nuclear magnetic resonance logging tool motion.

Statement 17: The method of claim 11-13 or 16, further comprising performing a frequency-domain processing of the one or more frequencies to suppress distortions in the echo train after emitting the one or more refocusing pulses.

Statement 18: A system may comprise a nuclear magnetic resonance logging tool, which may comprise an electromagnetic transmitter configured to emit a magnetic field, a radio frequency transmitter configured to transmit a pulse and one or more refocusing pulses, and a receiver configured to detect one or more frequencies from an echo train. The system may further comprise an information handling system configured to estimate one or more amplitudes and a characteristic time scale of a nuclear magnetic resonance logging tool motion, identify an upper limit of an amplitude for the tool motion, identify a frequency range based at least in part on the upper limit of the amplitude for the tool motion, record the one or more frequencies form the echo train, model one or more spin dynamics, and perform a frequency-domain processing of the one or more frequencies to suppress distortions in an echo train.

Statement 19: The system of statement 18, wherein the information handling system is further configured to increase the bandwidth of the one or more refocusing pulse as the nuclear magnetic resonance logging tool moves in the wellbore.

Statement 20. The system of statements 18 or 19, wherein the information handling system is further configured to apply a frequency domain processing to modify a phase or an amplitude of the one or more frequencies for suppressing the distortions in the echo train.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the element that it introduces.

All numerical values within the detailed description and the claims herein modified by "about" or "approximately" with respect the indicated value are intended to take into account experimental error and variations that would be expected by a person having ordinary skill in the art.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
    disposing a nuclear magnetic resonance logging tool into a wellbore, wherein the nuclear magnetic resonance logging tool comprises:
        an electromagnetic transmitter configured to emit a magnetic field;
        a radio frequency transmitter configured to transmit a pulse; and
        a receiver configured to detect one or more frequencies from an echo train;
    identifying an upper limit of an amplitude for tool motion;
    identifying a frequency range based at least in part on the upper limit of the amplitude for tool motion;
    measuring the one or more frequencies from the echo train; and
    performing a frequency-domain processing of the one or more frequencies to suppress distortions in an echo train.

2. The method of claim 1, wherein the frequency-domain processing includes a matched filter.

3. The method of claim 1, further comprising decreasing a bandwidth of the receiver to suppress distortions in the echo train.

4. The method of claim 3, wherein the decreasing the bandwidth of the receiver comprises reducing the bandwidth of a matched filter.

5. The method of claim 3, wherein the decreasing the bandwidth is based at least in part on the characteristic time scale at which distortions develop in the echo train.

6. The method of claim 1, wherein the amplitude of the tool motion determines a minimum bandwidth of the receiver to detect the one or more frequencies.

7. The method of claim 1, wherein the frequency-domain processing further includes modifying a phase or an amplitude of the one or more frequencies for suppressing the distortions in the echo train.

8. The method of claim 1, further comprising applying a frequency domain processing based on one or more estimated amplitudes of the tool motion for quality control.

9. The method of claim 8, further comprising applying a reduction in receiver bandwidth for a larger amplitude or a smaller amplitude than one or more estimated amplitudes of the tool motion.

10. The method of claim 1, further comprising modeling one or more spin dynamics, including a motion or evolution of spins of nuclei in response to magnetic fields and adjusting the pulse based on the modeled spin dynamics.

11. A method comprising:
    disposing a nuclear magnetic resonance logging tool into a wellbore, wherein the nuclear magnetic resonance logging tool comprises:
        an electromagnetic transmitter configured to emit a magnetic field;
        a radio frequency transmitter configured to transmit a pulse; and
        a receiver configured to detect one or more frequencies from an echo train;
    moving the nuclear magnetic resonance logging tool in the wellbore
    selecting a shape for one or more refocusing pulses;
    emitting the one or more refocusing pulses;
    modeling spin-dynamics including the motion or evolution of spins of one or more nuclei in response to magnetic fields to determine how the bandwidth of the refocusing pulses may be adjusted;

increasing the bandwidth of the one or more refocusing pulse as the nuclear magnetic resonance logging tool moves in the wellbore; and recording one or more echoes.

12. The method of claim 11, further comprising increasing a bandwidth of the one or more refocusing pulses with one or more shorter pulses of increased radio frequency power.

13. The method of claim 11, further comprising characterizing motion of the nuclear magnetic resonance logging tool from the changes in frequency content based at least in part on the spin-dynamics model.

14. The method of claim 13, further comprising optimizing a rate at which pulse bandwidth is increased at one or more times during the one or more echoes and optimizing the shape of the one or more refocusing pulses.

15. The method of claim 11, further comprising estimating one or more amplitudes and a characteristic time scale of a nuclear magnetic resonance logging tool motion.

16. The method of claim 11, further comprising performing a frequency-domain processing of the one or more frequencies to suppress distortions in the echo train after emitting the one or more refocusing pulses.

17. A system comprising:
a nuclear magnetic resonance logging tool comprising:
an electromagnetic transmitter configured to emit a magnetic field;
a radio frequency transmitter configured to transmit a pulse and one or more refocusing pulses; and
a receiver configured to detect one or more frequencies from an echo train; and
an information handling system configured to:
estimate one or more amplitudes and a characteristic time scale of a nuclear magnetic resonance logging tool motion;
identify an upper limit of an amplitude for the tool motion;
identify a frequency range based at least in part on the upper limit of the amplitude for the tool motion;
record the one or more frequencies form the echo train;
model one or more spin dynamics including a motion or evolution of spins of one or more nuclei in response to magnetic fields to determine how the bandwidth of the refocusing pulses may be adjusted; and
perform a frequency-domain processing of the one or more frequencies to suppress distortions in an echo train.

18. The system of claim 17, wherein the information handling system is further configured to increase the bandwidth of the one or more refocusing pulse as the nuclear magnetic resonance logging tool moves in the wellbore.

19. The system of claim 17, wherein the information handling system is further configured to apply a frequency domain processing to modify a phase or an amplitude of the one or more frequencies for suppressing the distortions in the echo train.

* * * * *